1 US009473663B2

(12) United States Patent
Toshima

(10) Patent No.: US 9,473,663 B2
(45) Date of Patent: Oct. 18, 2016

(54) CONTROL DEVICE, METHOD OF CONTROLLING A MULTIFUNCTION DEVICE, AND A STORAGE MEDIUM STORING A PROGRAM EXECUTED BY A CONTROL UNIT THAT CONTROLS A RECORDING DEVICE

(71) Applicant: Seiko Epson Corporation, Tokyo (JP)

(72) Inventor: Kazuya Toshima, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/663,757

(22) Filed: Mar. 20, 2015

(65) Prior Publication Data

US 2015/0249768 A1    Sep. 3, 2015

Related U.S. Application Data

(63) Continuation of application No. 13/595,295, filed on Aug. 27, 2012, now abandoned.

(30) Foreign Application Priority Data

Sep. 27, 2011 (JP) ................................. 2011-210379

(51) Int. Cl.
| | |
|---|---|
| G06F 15/00 | (2006.01) |
| H04N 1/00 | (2006.01) |
| G06F 3/12 | (2006.01) |
| H04N 1/32 | (2006.01) |

(52) U.S. Cl.
CPC ........ *H04N 1/00941* (2013.01); *G06F 3/1204* (2013.01); *G06F 3/1229* (2013.01); *G06F 3/1236* (2013.01); *G06F 3/1285* (2013.01); *H04N 1/00952* (2013.01); *H04N 1/00962* (2013.01); *H04N 1/32571* (2013.01); *G06F 3/1228* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,195,453 B1 * | 2/2001 | Simonoff ............. | G06Q 20/042 235/379 |
| 2004/0250171 A1 | 12/2004 | Norman | |
| 2008/0304096 A1 * | 12/2008 | Maglanque ........ | H04N 1/00954 358/1.15 |
| 2011/0134453 A1 | 6/2011 | Sakiyama | |
| 2011/0211217 A1 * | 9/2011 | Amano ................... | G06F 3/121 358/1.14 |
| 2011/0222113 A1 | 9/2011 | Adachi et al. | |
| 2012/0013931 A1 * | 1/2012 | Tsujimoto .......... | H04N 1/00204 358/1.13 |

(Continued)

FOREIGN PATENT DOCUMENTS

| | | |
|---|---|---|
| JP | 2000-222229 A | 8/2000 |
| JP | 2003-335034 A | 11/2003 |
| JP | 2003-337663 A | 11/2003 |

(Continued)

*Primary Examiner* — Helen Q Zong

(57) ABSTRACT

When using a multifunction device having plural devices providing the multiple functions, a control device, a method of controlling the multifunction device, and a program enable programs that are not optimized for the multifunction device to use the multifunction device. A host computer controlling a multifunction device through application program execution units executes plural application programs each corresponding to at least one of the multiple devices. A port control process receives data from the multifunction device through a USB port, exclusively controls data output by the application program execution units, sends the data from the USB port to the multifunction device, and filters and passes data received from the multifunction device by the port control process to the application program execution units.

13 Claims, 5 Drawing Sheets

(56) References Cited

U.S. PATENT DOCUMENTS

2012/0236354 A1* 9/2012 Mitsui .................. G06F 9/4411
358/1.13

FOREIGN PATENT DOCUMENTS

| JP | 2011-123607 A | 6/2011 |
| WO | 2011/071092 A1 | 6/2011 |

* cited by examiner

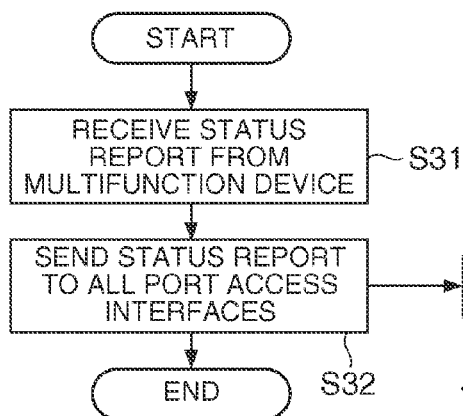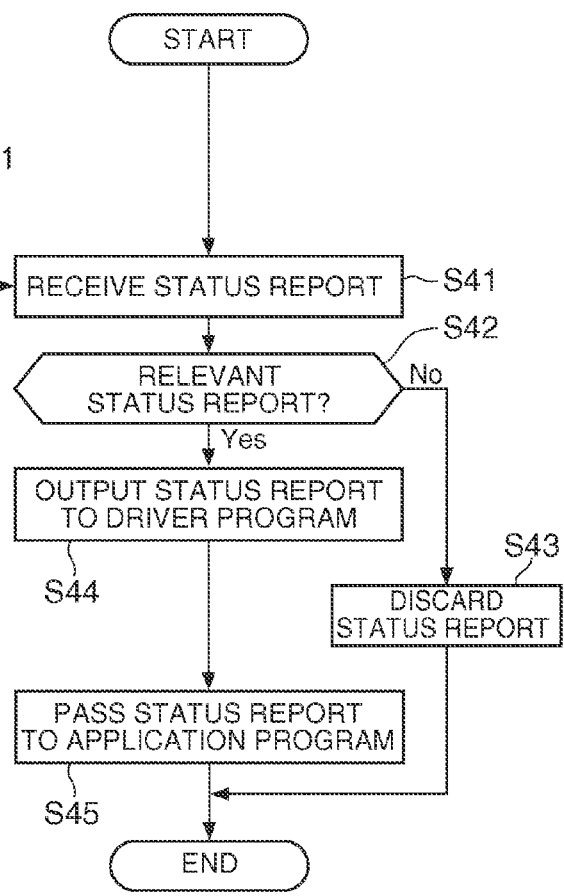

CONTROL DEVICE, METHOD OF CONTROLLING A MULTIFUNCTION DEVICE, AND A STORAGE MEDIUM STORING A PROGRAM EXECUTED BY A CONTROL UNIT THAT CONTROLS A RECORDING DEVICE

CROSS-REFERENCE TO RELATED APPLICATION(S)

This application is a continuation of, and claims priority under 35 U.S.C. §120 on, U.S. application Ser. No. 13/595,295, filed Aug. 27, 2012, which claims priority under 35 U.S.C. §119 on Japanese Application No. 2011-210379, filed Sep. 27, 2011. The content of each such related application is incorporated by reference herein in its entirety.

BACKGROUND

1. Technical Field

The present invention relates to a control device that controls a multifunction device, method of controlling a multifunction device, and a storage medium storing a program executed by a control unit that controls a recording device.

2. Related Art

Multifunction devices that have plural devices for processing media, such as a printer for printing on processed media and a scanner for reading processed media, are known from the literature. The host device that controls such multifunction devices usually runs device driver programs corresponding to the functions of the devices in the multifunction device. See, for example, Japanese Unexamined Patent Appl. Pub. JP-A-2003-335034.

Multifunction devices generally have multiple functions, and often require a dedicated device driver program for each different device used to provide the multiple functions. Application programs that use the multifunction device through the device driver programs may also be optimized for the specifications of the multifunction device. When such a configuration is used and a new multifunction device is introduced or the model is changed, software must be developed for the new multifunction device, and reducing the burden of software development is desirable.

SUMMARY

With consideration for the foregoing problem, the present invention provides a control device that, when using a multifunction device having plural devices providing the multiple functions, enables using the multifunction device through programs that are not optimized for the multifunction device, a method of controlling the control device, and a storage medium storing a program that is run by a control unit that controls a recording device.

To achieve the foregoing object, one aspect of the invention is a control device that controls a multifunction device having a plurality of devices, including: a plurality of application execution units that respectively execute a plurality of application programs each corresponding to at least one of the plural devices; a port control unit that receives data from the multifunction device through a connection port, exclusively controls data input from the plural application execution units, and sends data from the connection port to the multifunction device; and a plurality of interfaces that correspond to the plural application execution units, and filter and pass data received by the port control unit to the application execution units.

A control device according to this aspect of the invention enables plural application programs to send data to the multifunction device, and acquire status information sent from the multifunction device, through the connection port. As a result, the control device can use multiple application programs that each use the multifunction device without each application program having a function to cooperate with other application programs. Optimizing the application programs to the configuration of the multifunction device is therefore not necessary, and the control device can enable application programs designed for use with devices having a single function to use a multifunction device.

A control device according to another aspect of the invention preferably also has a plurality of filter units that correspond individually to the plural interfaces, and extract status information related to the application program corresponding to the matching interface from the data received by the port control unit from the multifunction device.

With this aspect of the invention, the control device can extract and pass status information related to a particular application program from the data sent by the multifunction device to any of multiple application programs. Status information can therefore be acquired from the multifunction device and control based on the status of the multifunction device is possible without the application programs being optimized for the configuration of the multifunction device.

Further preferably, the control device also has a plurality of command control units that correspond individually to the application programs and generate commands controlling the multifunction device based on data input from the application execution units, and can generate normal commands causing the multifunction device to execute a particular device function, real-time commands that are executed with priority over normal commands, and a status monitor configuration command that causes the multifunction device to send a status report when the operating status changes.

The control device in this aspect of the invention can send normal commands to control the multifunction device based on data output by the application program, can send real-time commands and control the multifunction device even when the multifunction device is busy, and can send status monitor configuration commands to make the multifunction device send status reports automatically. The multifunction device can therefore be controlled in detail without using an application program optimized for the configuration of the multifunction device.

Further preferably in a control device according to another aspect of the invention, the port control unit exchanges data with the multifunction device through the single connection port, outputs data received from the multifunction device through the connection port to all interfaces, and exclusively sends commands generated by any command control unit through the connection port to the multifunction device.

When the control device communicates data with an multifunction device having multiple devices through a single connection port, this aspect of the invention enables controlling the multifunction device with multiple application programs that are not optimized for the configuration of the multifunction device.

Another aspect of the invention is a method of controlling a control device that controls a multifunction device having a plurality of devices, including steps of: executing a plurality of application programs each corresponding to at least one of the plural devices; receiving data from the multifunction device through a connection port connected to the multifunction device, exclusively controlling data from the plural application programs, and sending data from the connection port to the multifunction device; and filtering and passing data received from the multifunction device to the application programs.

By executing this control program, the control device enables plural application programs to send data to the multifunction device, and acquire status information sent from the multifunction device, through the connection port. As a result, multiple application programs that each use the multifunction device can be used without each application program having a function to cooperate with other application programs. Optimizing the application programs to the configuration of the multifunction device is therefore not necessary, and application programs designed for use with devices having a single function can use a multifunction device.

Another aspect of the invention is a computer-readable storage medium that stores a program executed by a control unit that controls a multifunction device having a plurality of devices, wherein the program causes the control unit to execute steps of: executing a plurality of application programs each corresponding to at least one of the plural devices; receiving data from the multifunction device through a connection port, exclusively controlling data from the plural application programs, and sending data from the connection port to the multifunction device; and filtering and passing data received from the multifunction device to the application programs.

By running this program, the control unit can run multiple application programs and send data to the multifunction device, and acquire status information sent from the multifunction device, through the connection port. As a result, each of multiple application programs that use the multifunction device can be used without each application program having a function to cooperate with other application programs. Optimizing the application programs to the configuration of the multifunction device is therefore not necessary, and application programs designed for use with devices having a single function can use a multifunction device.

Effect of the Invention

The invention enables using application programs that have not been optimized to the configuration of a multifunction device to use multifunction devices.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 5(A) and 5(B) are flow charts of the status control process of the recording system.

DESCRIPTION OF EMBODIMENTS

A preferred embodiment of the present invention is described below with reference to the accompanying figures.

Figure 1:
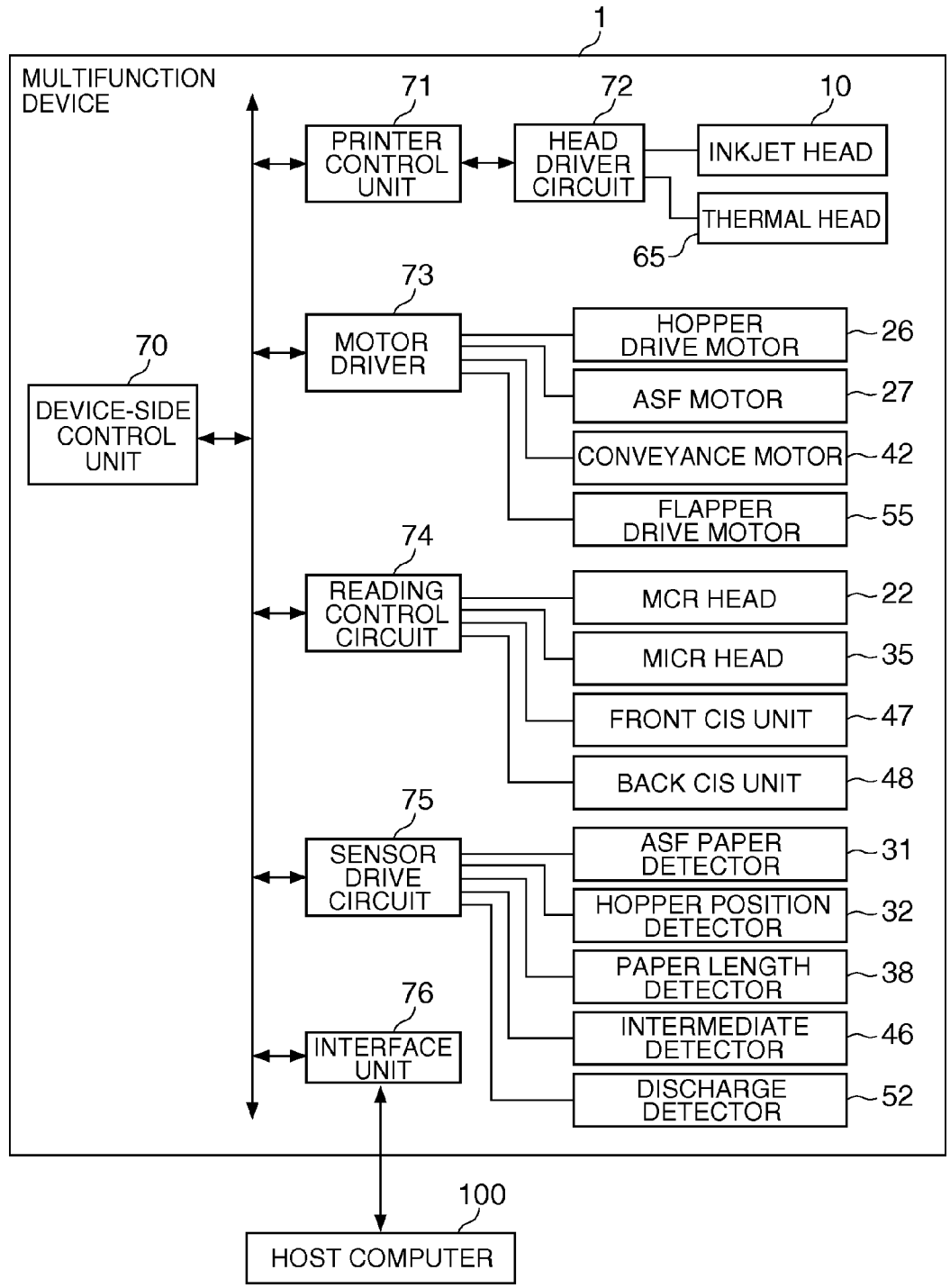
FIG. 1 is a function block diagram of a multifunction device with a recording system according to the invention.

FIG. 1 is a function block diagram of a multifunction device 1 used in a recording system 8.

The recording system 8 includes the multifunction device 1 shown in FIG. 1 connected to a host computer 100 as a control device that controls the multifunction device 1.

The multifunction device 1 has motors and conveyance rollers as a conveyance unit that conveys media that are processed, a MICR (magnetic ink character recognition) head 35 that reads the MICR line of the processed medium, an inkjet head 10 that prints on the processed medium, and a front CIS (contact image sensor) unit 47 and back CIS unit 48 that optically read the processed medium, disposed to the conveyance path of the processed medium. The processed medium is a cut-sheet medium of a size within a specific range, and this embodiment of the invention is described using checks as an example of the processed medium.

A check is a form having a payment amount, payee, serial number, payer signature, and other information printed or written on a sheet (paper) with a specific colored or patterned background. The payment amount, payee, serial number, payer signature, and other information are printed on the face (front), and an endorsement area is provided on the back. An MICR (magnetic ink character recognition) line is preprinted along the length of the check on the face. The MICR line is a line of magnetic ink characters printed with magnetic ink, and can be read magnetically and optically. The lengths of the short and long sides of a check are standardized, but can be of various different sizes because there are different standards. The multifunction device 1 according to this embodiment of the invention defines a maximum check size that includes substantially all commonly used sizes of checks, and can process any check within this maximum size.

The multifunction device 1 executes an MICR function that reads the MICR line recorded on the check, a printer function that records (prints) text and images on the checks, and a scanner function that optically scans and images both sides of the checks.

When executing the MICR function according to commands sent from the host computer 100, the multifunction device 1 controls the MICR head 35 that magnetically reads the MICR line in contact with the check surface to read the MICR line and send the magnetic waveforms or the result of recognizing the magnetic waveforms to the host computer 100.

When executing the printer function according to commands and print data sent from the host computer 100, the multifunction device 1 generates a print image of the text and images contained in the print data, and prints on the check using the inkjet head 10. As a result, an endorsement is printed as text or an image in the endorsement area on the back of the check.

When executing the scanner function according to commands sent from host computer 100, the multifunction device 1 optically images the front and back sides of the check with the front CIS unit 47 and back CIS unit 48, and sends the image data from the front and the image data from the back to the host computer 100.

Because the MICR head 35, inkjet head 10, and front CIS unit 47 and back CIS unit 48 are disposed in order along the conveyance path, the MICR function, printer function, and scanner function are applied sequentially to the checks. When, for example, the MICR line cannot be correctly recognized with the MICR function, this configuration enables reading the check by means of OCR (optical character recognition) based on the image data of the face captured by the front CIS unit 47, and scanning the check after printing an endorsement with the inkjet head 10. Once a check is loaded, the multifunction device 1 can therefore quickly process the check in a continuous sequence of MICR, printer, and scanner functions according to commands sent from the host computer 100. This operating sequence includes feeding the check to be processed into the conveyance path, conveyance through the conveyance path, and discharging the processed check into a specific exit pocket (not shown in the figure).

The multifunction device 1 also has a photo ID function that optically reads identification cards using the front CIS unit 47 and back CIS unit 48. This photo ID function is a function that optically reads and generates images of the processed medium when the user of the multifunction device 1 sets a card medium (such as a photo identification card) in a card scanner slot that branches from the check conveyance path. When executing the photo ID function according to commands sent from the host computer 100, the multifunction device 1 detects insertion of a card, optically scans the card with either or both the front CIS unit 47 and back CIS unit 48, and sends the image data to the host computer 100.

The multifunction device 1 also has a roll paper compartment (not shown in the figure) in which thermal roll paper is loaded, and a thermal head 65 that prints on thermal roll paper. The multifunction device 1 can thus print on thermal roll paper separately from checks or other processed media. When executing the thermal printer function using the thermal head 65 according to commands and print data sent from the multifunction device 1, the multifunction device 1 generates a print image of the text and images contained in the print data, and prints with the thermal head 65 while conveying the thermal roll paper. The multifunction device 1 could also have an automatic cutter unit, in which case the thermal roll paper is conveyed to a specific position and cut after printing by the thermal printer function.

Separately from the conveyance path for checks or other processed media, the multifunction device 1 also has a slot for swiping magnetic stripe cards such as credit cards and debit cards, and an MCR head 22 for reading magnetic information recorded on the magnetic cards passed through the slot. The multifunction device 1 has a MCR function that reads the magnetic information when the user passes a magnetic stripe card through the slot and outputs to the host computer 100. When executing the MCR function, the multifunction device 1 reads the magnetic information with the MCR head 22 according to commands sent from the host computer 100, and sends the magnetic waveform or the result of recognizing the magnetic waveform that was read to the host computer 100.

As shown in FIG. 1, the multifunction device 1 has a multifunction device-side control unit 70 including a CPU that controls multifunction device 1 operation, RAM, and flash ROM; a printer control unit 71; a head driver circuit 72, a motor driver 73, a reading control circuit 74, a sensor drive circuit 75, and an interface unit 76, which are connected so that they can communicate with each other.

The device-side control unit 70 controls the other parts of the multifunction device 1 by means of the CPU reading and running a control program stored in flash ROM.

The printer control unit 71 supplies drive current to the inkjet head 10 through the head driver circuit 72 to print on a check 4 as controlled by the device-side control unit 70. The printer control unit 71 also supplies drive current to the thermal head 65 through the head driver circuit 72 to print on thermal roll paper as controlled by the device-side control unit 70. The inkjet head 10 can be capped with a cap not shown, and can be flushed, cleaned, and wiped with a wiper. The printer control unit 71 flushes, cleans, and wipes the inkjet head 10 with a wiper as controlled by the device-side control unit 70.

The conveyance mechanism that conveys checks in the multifunction device 1 includes a hopper and pickup roller that pick and feed a single check from a stacker where unprocessed checks are stored, an ASF (automatic sheet feeder) roller that pulls the fed check into the conveyance path, a plurality of conveyance rollers that convey the checks downstream through the conveyance path, a flapper that appropriately changes the exit pocket into which the check processed on the conveyance path is discharged, and a discharge roller that discharges the check in the direction determined by the flapper.

The motor driver 73 is connected to a hopper drive motor 26 that moves the hopper, an ASF motor 27 that operates the ASF roller, a conveyance motor 42 that operates the pickup roller, conveyance roller, and discharge roller, and a flapper drive motor 55 that moves the flapper, outputs drive current and drive pulses to these motors, and operates the motors as controlled by the device-side control unit 70.

The motor driver 73 together with the rollers and motors renders a conveyance mechanism.

The reading control circuit 74 is connected to the MCR head 22, MICR head 35, front CIS unit 47, and back CIS unit 48.

The reading control circuit 74 causes the MCR head 22 to read the magnetic information when a card is swiped through the card slot 21, and digitizes and outputs the read signal output from the MCR head 22 to the device-side control unit 70, as controlled by the control unit 70.

The reading control circuit 74 also reads magnetic information with the MICR head 35, and digitizes and outputs the read signal output from the MICR head 35 to the device-side control unit 70 as controlled by the device-side control unit 70.

The reading control circuit 74 also images the face and back of the check 4 with the front CIS unit 47 and back CIS unit 48 as controlled by the device-side control unit 70, and digitizes and outputs the signals output from the front CIS unit 47 and back CIS unit 48 to the device-side control unit 70.

An ASF paper detector 31 that detects if a check is present, and a hopper position detector 32 that detects if the hopper is in the standby position, are disposed to the stacker. The multifunction device 1 also has other sensors for detecting the check at various places including along the conveyance path. For example, a paper length detector 38 disposed before the MICR head 35 detects the check conveyed by the ASF roller, and the device-side control unit 70 can determine the length of the check by detecting the leading and trailing ends of the check with the paper length detector 38.

An intermediate detector 46 is disposed between the MICR head 35 and the inkjet head 10 located downstream therefrom, and a discharge detector 52 is located downstream from the front CIS unit 47 and back CIS unit 48. The device-side control unit 70 watches if the check is correctly conveyed based on output from the intermediate detector 46 and discharge detector 52.

The foregoing ASF paper detector 31, hopper position detector 32, paper length detector 38, intermediate detector 46, and discharge detector 52 are connected to the sensor drive circuit 75. The sensor drive circuit 75 supplies current to the foregoing sensors, gets the output values therefrom at specific times, and digitizes and outputs the acquired output values to the device-side control unit 70.

Other sensors, including a thermistor for detecting the temperature of the thermal head 65, can also be connected to the sensor drive circuit 75.

The interface unit 76 is connected by wire or wirelessly to the host computer 100, and exchanges data including control data with the host computer 100 as controlled by the device-side control unit 70.

Figure 2:
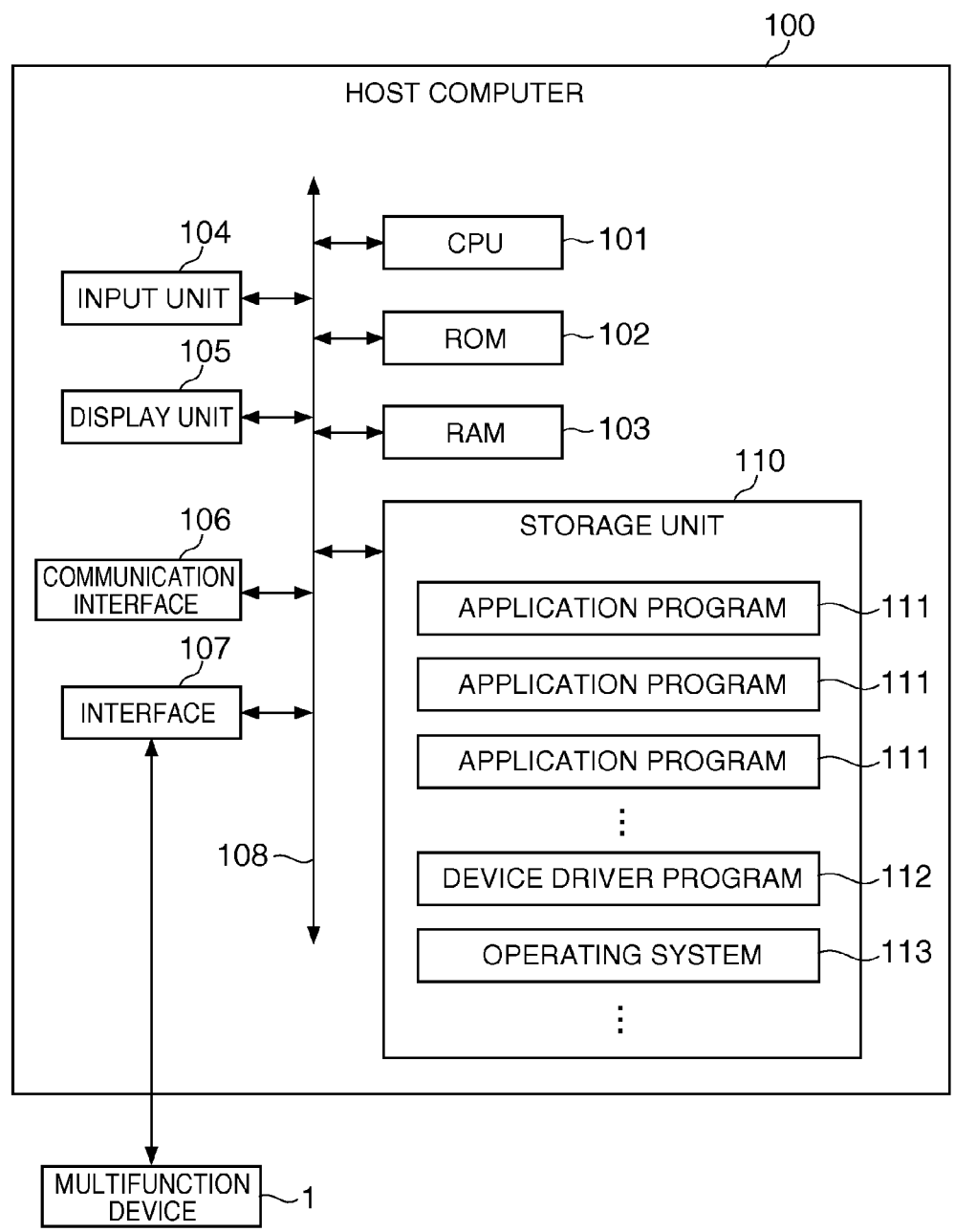
FIG. 2 is a function block diagram of the host computer.

FIG. 2 is a function block diagram of the host computer 100.

The host computer 100 has a CPU 101 that runs a program and centrally controls other parts of the host computer 100, and renders the function of the host computer 100 as a control device; ROM 102 that nonvolatilely stores the basic control program run by the CPU 101 and related data; RAM 103 used as working memory to temporarily store programs run by the CPU 101 and processed data; and a storage unit 110 that stores an application program run by the CPU 101 and data related to the program.

The host computer 100 also has an input unit 104 that detects input operations using a keyboard, mouse, or other input device, and outputs data identifying the detected operation to the CPU 101; a display unit 105 that displays content input with the input device, data processed by the CPU 101, and other information about the process results on a display screen such as an LCD panel or OLED panel; a communication interface 106 that exchanges data with an external computer over a communication network; and an interface 107 that communicates data with the multifunction device 1. These various devices communicate with each other over a common bus 108 to which they are connected.

In this embodiment the interface 107 and the interface unit 76 of the multifunction device 1 have USB (Universal Serial Bus) connectors and interface circuits, and are connected with USB cables. The interface 107 and interface unit 76 can each have plural USB ports or connection ports other than USB ports, but the interface unit 76 and interface 107 are described in this embodiment as being connected through a single USB port. The host computer 100 can also virtualize a connection port with a function of the operating system 113, and be configured with a plurality of logical ports regardless of the number of physical connection ports in the interface 107, but in this embodiment is logically connected to the multifunction device 1 through a single connection port (USB port).

The storage unit 110 stores a plurality of application programs 111, a device driver program 112, and the operating system 113 that are run by the CPU 101.

The operating system 113 is a system of plural programs that render the basic functions of the host computer 100, and is run by the CPU 101. This operating system 113 provides function modules for the device driver program 112 and application programs 111. For example, the CPU 101 running the operating system 113 provides a function that controls the USB port 109 (FIG. 3) of the interface 107, and enables data communication through the USB port 109 when the device driver program 112 is executed. The storage unit 110 can obviously also store programs and data other than those described above.

The plural application programs 111 correspond to the plural functions of the multifunction device 1, and are programs that control the multifunction device 1.

The device driver program 112 is a program whereby the host computer 100 controls the multifunction device 1, and has functions for generating commands sent to the multifunction device 1 and processing status reports sent from the multifunction device 1.

Figure 3:
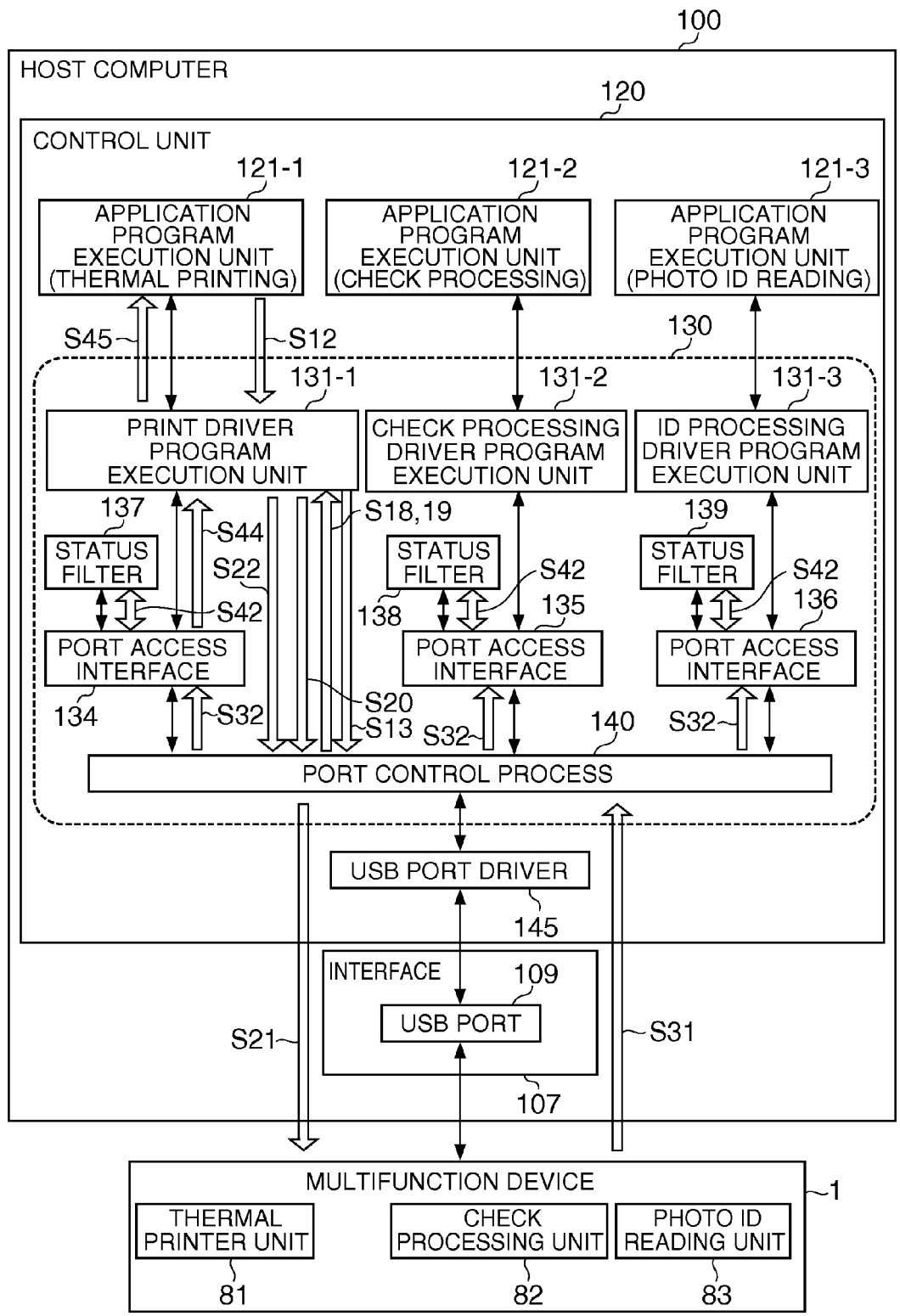
FIG. 3 schematically shows the software configuration of the host computer.

FIG. 3 is a block diagram of the structure of software executed by the host computer 100.

The functions of the devices incorporated in the multifunction device 1 are shown in FIG. 3 as the thermal printer unit 81, check processing unit 82, and photo ID reading unit 83.

The thermal printer unit 81 includes the thermal head 65 and the conveyance motor 42 that conveys the thermal roll paper, and the printer control unit 71, head driver circuit 72, and device-side control unit 70 that control these. When the multifunction device 1 has an auto cutter unit, the cutter unit is also included in the thermal printer unit 81.

The check processing unit 82 includes as function units that process checks: the rollers, hopper drive motor 26, ASF motor 27, conveyance motor 42, and flapper drive motor 55 of the conveyance mechanism described above; the inkjet head 10; the front CIS unit 47, back CIS unit 48 and MICR head 35 that read the checks; the ASF paper detector 31, hopper position detector 32, paper length detector 38, intermediate detector 46, discharge detector 52, and other sensors related to check conveyance; and the device-side control unit 70, printer control unit 71, head driver circuit 72, motor driver 73, reading control circuit 74, and sensor drive circuit 75 that control these other devices.

The photo ID reading unit 83 includes the front CIS unit 47 and back CIS unit 48 that image photo ID cards, and the device-side control unit 70 and reading control circuit 74 that control the CIS units.

Because the devices incorporated in the multifunction device 1 are used by plural functions, a single device may also be included in plural function units.

The control unit 120 of the host computer 100 is rendered by the CPU 101, ROM 102, RAM 103, and storage unit 110, and functions of the application programs 111, device driver program 112, and operating system 113 that are executed by the CPU 101.

The control unit 120 has a plurality of application program execution units 121 (application execution means) that are rendered by the CPU 101 running the application programs 111. As examples of application program execution units 121, this embodiment describes an application program execution unit 121-1 that causes the thermal printer unit 81 to print; an application program execution unit 121-2 that causes the check processing unit 82 to read a check; and an application program execution unit 121-3 that causes the photo ID reading unit 83 to read a photo ID card.

Note that the application program execution units 121-1 to 121-3 are referred to collectively as application program execution units 121.

The control unit 120 has a device driver program execution unit 130 that is rendered by the device driver program 112 (FIG. 2). The device driver program execution unit 130 includes a plurality of driver program execution units 131 (command control units), and a plurality of port access interfaces 134, 135, 136 (interfaces) and status filters 137, 138, 139 (filtering units) corresponding to the plural driver program execution units 131.

The device driver program execution unit 130 has a port control process 140 (port control unit) enabling a plurality of application program execution units 121 to communicate through a single USB port. The driver program execution units 131 in this embodiment include a print driver program execution unit 131-1 corresponding to the application program execution unit 121-1 for thermal printing; a check processing driver program execution unit 131-2 corresponding to the application program execution unit 121-2 for reading checks; and a ID processing driver program execution unit 131-3 corresponding to the application program execution unit 121-3 for reading photo ID cards.

These driver program execution units 131-1 to 131-3 are referred to collectively as driver program execution units 131.

The application program execution unit 121-1 edits the text or image to be printed on the thermal roll paper, and outputs a print command with the image data and the character codes identifying the characters to be printed to the multifunction device 1. The application program execution unit 121-1 also acquires the status of the multifunction device 1, and delays sending the print command and print data if the multifunction device 1 is busy or off-line.

The application program execution unit 121-2 outputs data including commands to start check conveyance and start reading to the multifunction device 1. The multifunction device 1 sends the image data captured by the front CIS unit 47 and back CIS unit 48 as a response to the command sent from the host computer 100 to the multifunction device 1 in the same way as status reports. More specifically, the multifunction device 1 sends the captured image data in the same way as information identifying the current operating state of the multifunction device 1 (such as off-line, on-line, error occurred, cause of the error, error resolution, busy, busy state cancelled, reading successful, reading failure), and the application program execution unit 121-2 gets the captured image data sent as a status report.

The application program execution unit 121-3 outputs data including a command to start scanning a photo ID to the multifunction device 1. The photo ID reading unit 83 of the multifunction device 1 sends the image data captured by the front CIS unit 47 and back CIS unit 48 as a status report in the same way as the scanned check images. The application program execution unit 121-3 thus gets the scanned image data sent as a status report.

The three driver program execution units 131 generate commands for the multifunction device 1 based on data output by the corresponding application program execution units 121. More specifically, the print driver program execution unit 131-1 generates commands, such as a print command for the thermal printer unit 81, and print data based on the data output by the application program execution unit 121-1, and outputs through the port access interface 134 to the port control process 140.

Likewise, the check processing driver program execution unit 131-2 generates commands for the check processing unit 82 based on data output by the application program execution unit 121-2, and outputs through the port access interface 135 to the port control process 140, and ID processing driver program execution unit 131-3 generates commands for the photo ID reading unit 83 based on data output by the application program execution unit 121-3, and outputs through port access interface 136 to the port control process 140.

The port access interfaces 134, 135, 136 function as interfaces between the driver program execution units 131 and the port control process 140, and handle part of status report distribution control by the port control process 140 described below.

The port control process 140 exclusively controls commands and data input from the three driver program execution units 131. The port control process 140 uses a function of the USB port driver 145 provided by the operating system 113 (FIG. 2) to exchange data with the multifunction device 1 through one USB port 109 of the interface 107. The three driver program execution units 131 each attempt to occupy the USB port 109 when outputting commands and data. The three application program execution units 121 may not be optimized for the configuration of the multifunction device 1, and may not have a function that works with another application program execution unit 121 to render the plural functions of the multifunction device 1. As a result, when plural application program execution units 121 output data, plural driver program execution units 131 may attempt to occupy the USB port 109, and a collision occurs when one driver program execution unit 131 tries to occupy the USB port 109 when the USB port 109 is already occupied by another driver program execution unit 131.

The port control process 140 described below therefore allocates access to the USB port 109 to the three application program execution units 121 and the corresponding three driver program execution units 131.

The three application program execution units 121 operate based on the status data sent from the multifunction device 1. The application program execution unit 121-1 stops outputting print data when the multifunction device 1 is busy or off-line. The application program execution unit 121-2 and 121-3 receive the scanned image data sent as status reports by the multifunction device 1. Passing the status reports sent by the multifunction device 1 to the appropriate application program execution unit 121 is therefore necessary while avoiding passing irrelevant status reports to each application program execution unit 121 is also necessary.

When the multifunction device 1 sends a status report, the port control process 140 receives the status report and outputs to all of the port access interfaces 134, 135, 136. Each port access interface 134, 135, 136 has a corresponding status filter 137, 138, 139.

The status filters 137, 138, 139 respectively interpret the information contained in the status report, and based on information indicating the command to which the status report is responding, extracts (filters) only the status report related to the corresponding application program execution unit 121. As a result, the port access interfaces 134, 135, 136 output only status reports related to the corresponding application program execution unit 121 to the driver program execution unit 131, and each driver program execution unit 131 passes the status report input from the port access interface 134, 135, 136 to the appropriate application program execution unit 121.

Exclusive control by the port control process 140 and status report reception control are described next in detail.

Figure 4:
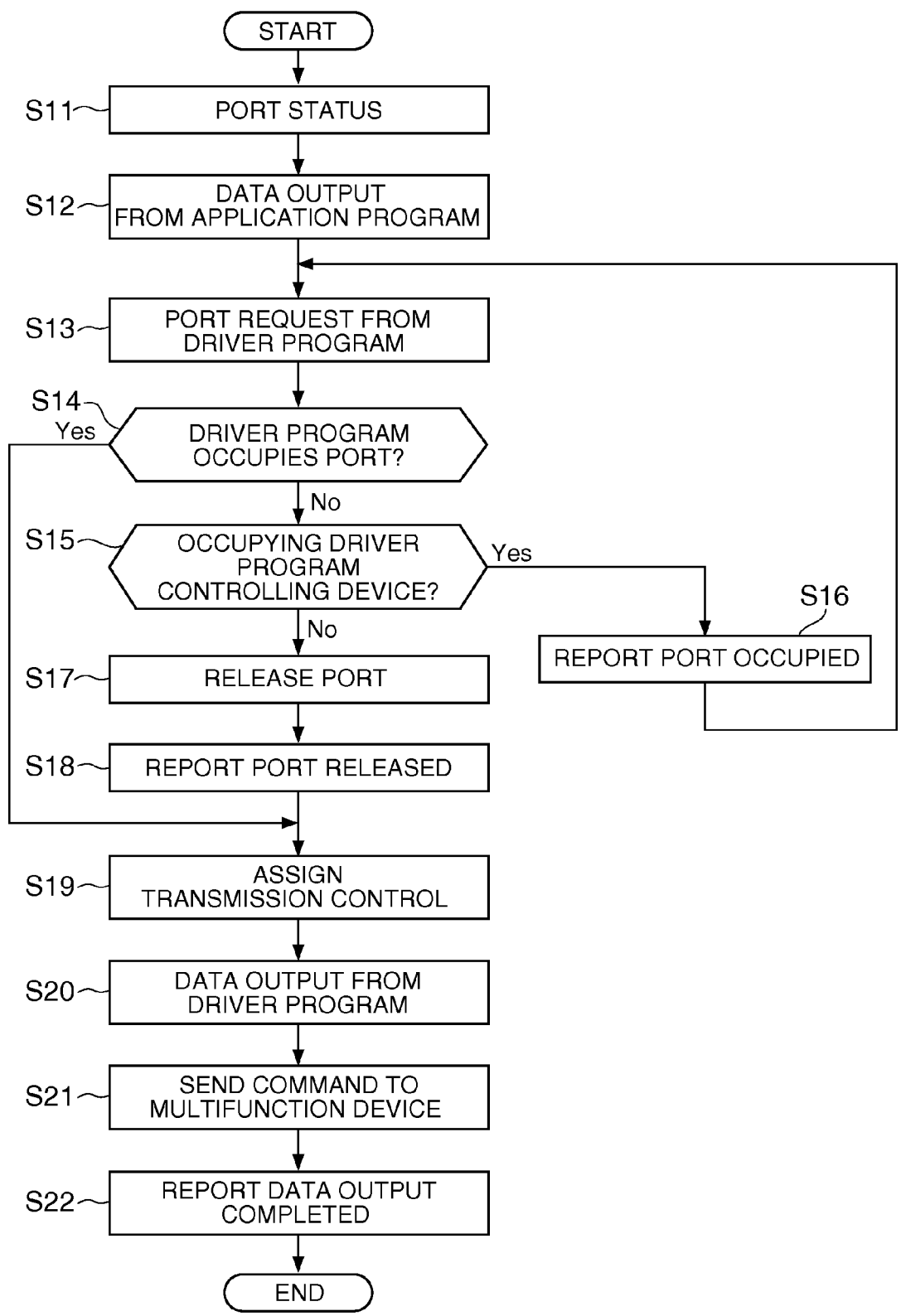
FIG. 4 is a flow chart of the port control process of the recording system.

FIG. 4 is a flow chart of the port control process, and FIG. 5 is a flow chart of the status report control process. The operation of selected steps in FIG. 4 and FIG. 5 is shown in FIG. 3 with arrows identified by the same reference numerals.

Port control by the port control process 140 is described first with reference to FIG. 4 and FIG. 3.

If the multifunction device 1 and host computer 100 are inactive, the port control process 140 enables one of the three driver program execution units 131 to occupy the USB port 109 (step S11). The driver program execution unit 131 that occupies the USB port 109 could be preassigned or the one that last occupied the USB port 109.

If one of the application program execution units 121 outputs data to control the multifunction device 1 (step S12), the driver program execution unit 131 corresponding to that application program execution unit 121 outputs a port access request to the port control process 140 (step S13).

The port control process 140 determines if the driver program execution unit 131 that requested to use the port already occupies the USB port 109 (step S14). When a port request is received from the driver program execution unit 131 occupying the USB port 109 (step S14 returns Yes), the port control process 140 skips to step S19.

When the driver program execution unit 131 requesting the port is not the driver program execution unit 131 occupying the USB port 109 (step S14 returns No), the port control process 140 determines if the driver program execution unit 131 occupying the USB port 109 is currently controlling the multifunction device 1 (step S15). For example, when the application program execution unit 121-2 is controlling the check processing unit 82 of the multifunction device 1 to read a check and the check processing driver program execution unit 131-2 is generating and outputting commands, the port control process 140 determines that the check processing driver program execution unit 131-2 is controlling the multifunction device 1. Note that the driver program execution units 131 could send an output completion report to the port control process 140 when a single process (job) controlling the multifunction device 1 is completed is possible, and in this case the port control process 140 determines that the multifunction device 1 is being controlled until an output completion report is received.

When the driver program execution unit 131 that output the port request is already occupying the USB port 109 and controlling the multifunction device 1 (step S15 returns Yes), the port control process 140 tells the driver program execution unit 131 that output the port request that the port is already occupied (step S16) and returns to step S13. The driver program execution unit 131 receiving the occupancy report then waits for a predetermined delay time and then outputs the port access request again.

If the driver program execution unit 131 occupying the USB port 109 is not controlling the multifunction device 1 (step S15 returns No), the port control process 140 tells the driver program execution unit 131 occupying the port that the port was released (step S17), then tells the driver program execution unit 131 that output the port request that the port was released (step S18), and goes to step S19.

In step S19 the port control process 140 gives transmission control to the driver program execution unit 131 that output the port request.

After transmission control is given to the driver program execution unit 131, the driver program execution unit 131 to which transmission control was assigned occupies the USB port 109. When the driver program execution unit 131 with transmission control outputs a command (step S20), the port control process 140 sends the command through the USB port 109 to the multifunction device 1 (step S21). After all communication required for the single process is completed, the driver program execution unit 131 sends a data output completion report to the port control process 140 (step S22). The port control process 140 then enters a standby mode and waits for input while the driver program execution unit 131 that last output data, or a preselected driver program execution unit 131, occupies the USB port 109.

Port control by the port control process 140 is described next with reference to FIG. 5 and FIG. 3. FIG. 5 (A) shows the operation of the port control process 140, and FIG. 5 (B) shows the operation of the port access interfaces 134, 135, 136.

When a status report is received from the multifunction device 1 (step S31), the port control process 140 distributes the received status report to all port access interfaces 134, 135, 136 (step S32).

The port access interfaces 134, 135, 136 receive the status report distributed from the port control process 140 (step S41) and filter the report with the corresponding status filter 137, 138, 139.

More specifically, port access interface 134 uses status filter 137 to extract status reports related to the application program execution unit 121-1 from the status reports (data) input from the port control process 140. The port access interface 134 determines if the status report distributed from the port control process 140 is a status report related to the application program execution unit 121-1 (step S42), and if not (step S42 returns No), discards the status report (step S43).

If the status report distributed from the port control process 140 is a status report related to the application program execution unit 121-1, the status filter 137 returns the status report to the port access interface 134 (step S42 returns Yes), the port access interface 134 outputs the status report to the print driver program execution unit 131-1 (step S44), and the status report is passed to the application program execution unit 121-1 (step S45).

Status filter 138 likewise interprets the information contained in status reports input from the port control process 140 to the port access interface 135, and extracts only the status reports related to application program execution unit 121-2. The port access interface 135 outputs the status report extracted by the status filter 138 from the status reports input from the port control process 140 to the check processing driver program execution unit 131-2, and the check processing driver program execution unit 131-2 passes this status report to the application program execution unit 121-2.

Status filter 139 likewise interprets the information contained in status reports input from the port control process 140 to the port access interface 136, and extracts only the status reports related to application program execution unit 121-3. The port access interface 136 outputs the status report extracted by the status filter 139 from the status reports input from the port control process 140 to the check processing driver program execution unit 131-3, and the check processing driver program execution unit 131-3 passes this status report to the application program execution unit 121-3.

Each of the application program execution units 121 of the host computer 100 can thus separately control the multifunction device 1 to execute particular operations because when plural application program execution units 121 without mutually interactive functions individually output data to the multifunction device 1, commands based on the data are generated and output to the inkjet head 10 so that the commands do not collide with each other. When the multifunction device 1 sends a status report to the host computer 100, the status report is distributed to the port access interface 134, 135, 136 of each application program execution unit 121, are filtered by the corresponding status filter 137, 138, 139, and passed only to the appropriate application program execution unit 121. Each of the application program execution units 121 can therefore control the multifunction device 1 based on status reports sent from the multifunction device 1.

Each application program execution unit 121 can therefore exchange data with the multifunction device 1 and use functions of the multifunction device 1 as if the application program execution units 121 were connected 1:1 to the multifunction device 1.

The host computer 100 can also send a status monitor configuration command that sets the automatic status back (ASB) function of the multifunction device 1 by an application program execution unit 121 that controls the multifunction device 1. More specifically, when a status request is sent from the host computer 100 to the multifunction device 1, the multifunction device 1 sends a status report containing information about the current operating status in response to the status request. The scanned image data is also sent from the multifunction device 1 as a response to a status request.

The multifunction device 1 also has a function that sends a status report to the multifunction device 1 every time the operating state changes when the host computer 100 sends a status monitor configuration command and the ASB function is appropriately configured. As a result, the multifunction device 1 sends a status report to the host computer 100 each time the printer status changes, including going off-line or on-line, when an error occurs, the cause of the error, error resolution, busy, busy state cancelled, reading successful, reading failure status information. If the status filters 137, 138, 139 of the host computer 100 extract the status information related to the corresponding application program execution units 121 from the status reports received by the ASB function, status information can be reported by the ASB function to all application program execution units 121. As a result, the multifunction device 1 can report the device status using the normal ASB function, and each application program execution unit 121 in the host computer 100 can receive status reports from the ASB function as if each application program execution unit 121 was connected 1:1 to the multifunction device 1 and irrespective of the presence of other application program execution units 121.

In addition, the host computer 100 is not limited to communicating normal commands for printing and scanning operations, and can send real-time commands to the multifunction device 1 to control the multifunction device 1. Real-time commands are commands that the multifunction device 1 can execute without operating device units such as the thermal printer unit 81, check processing unit 82, and photo ID reading unit 83, and include, for example, status requests, device-side control unit 70 software resets, and reset commands initializing hardware. Real-time commands can be received even when the multifunction device 1 is off-line or busy and cannot receive normal operating commands. In order to receive real-time commands, the multifunction device 1 could have buffer memory for storing real-time commands even when busy. When normal operating commands are received, the multifunction device 1 executes the commands stored in a memory buffer in the order received. When a real-time command is received, the multifunction device 1 executes the real-time command with priority over the reception order of any commands that were received before the real-time command.

When the application program execution unit 121 of the host computer 100 sends a real-time command to the multifunction device 1, the multifunction device 1 executes the command immediately and returns the result of the command as a status report to the host computer 100. Because the USB port 109 is occupied until the application program execution unit 121 controlling the multifunction device 1 completes the process, that is, until the driver program execution unit 131 outputs a process completion report, the port control process 140 can send a status request as a real-time command, receive the status report in response, and send a reset command as a real-time command in a single continuous operation, and prevent other application program execution units 121 from controlling the multifunction device 1 during this time. As a result, control using real-time commands is possible without control of the multifunction device 1 becoming confused.

As described above, a host computer 100 according to this embodiment of the invention has a plurality of application program execution units 121 that control a multifunction device 1 having a plurality of devices, and respectively execute a plurality of application programs 111 each corresponding to at least one of the plural devices; a port control process 140 that receives data from the multifunction device 1 through the USB port 109, exclusively controls data input from the application program execution units 121, and sends data from the USB port 109 to the multifunction device 1; and a plurality of port access interfaces 134, 135, 136 that correspond to the plural application program execution units 121, and extract and pass data received from the port control process 140 to the corresponding application program execution unit 121; and the plural application program execution units 121 can send data to the multifunction device 1 and receive status reports sent from the multifunction device 1 through the USB port 109.

Each application program 111 that uses the multifunction device 1 can be executed and control the multifunction device 1 without having a function enabling cooperation with another application program 111. As a result, the application program 111 does not need to be optimized for the configuration of the multifunction device 1, and application programs 111 designed for use with devices having a single function can also use the multifunction device 1.

Furthermore, because the control unit 120 has a plurality of status filters 137, 138, 139 that correspond individually to the plural port access interfaces 134, 135, 136 and extract status information related to the corresponding application program execution unit 121 from the data received by the port control process 140 from the multifunction device 1, and can extract and pass the relevant status information from the status reports sent by the multifunction device 1 to each of the appropriate plural application program execution units 121, even application programs 111 that are not optimized for the configuration of the multifunction device 1 can get status information from the multifunction device 1 and control operation based on the status of the multifunction device 1.

The plural driver program execution units 131 can also generate normal commands causing the multifunction device 1 to execute a particular device function, real-time commands that are executed with priority over normal commands, and a status monitor configuration command that causes the multifunction device 1 to send a status report when the operating status changes. The port control process 140 can pass responses to the real-time commands to all application program execution units 121, enable a single application program execution unit 121 to occupy the USB port 109 until the process related to the real-time command ends, and can pass status reports returned by the ASB function of the multifunction device 1 when the ASB function is configured by the status monitor configuration command to all application program execution units 121. As a result, the multifunction device 1 can be controlled in detail without using an application program 111 that is optimized for the configuration of the multifunction device 1.

Furthermore, because the port control process 140 exchanges data with the multifunction device 1 through a single USB port 109, outputs data received from the multifunction device 1 through the USB port 109 to all of the port access interfaces 134, 135, 136, and send commands generated by any of the driver program execution units 131 exclusively through the USB port 109 to the multifunction device 1, a multifunction device 1 that is connected through a single USB port 109 can be controlled by a plurality of application programs 111 that are not optimized for the configuration of the multifunction device 1.

A preferred embodiment of the invention is described above, but the invention is not so limited. For example, the functions rendered by the plural devices of the multifunction device 1 are not limited to the thermal printer unit 81, check processing unit 82, and photo ID reading unit 83, and there could be only two functions or more than three functions. The number of application programs 111 executed in parallel by the CPU 101 and the number of application program execution units 121, is also not limited, and there could be more than three.

The medium processed by the multifunction device 1 is also not limited to checks, and other types of forms and media of other sizes can also be used in the multifunction device 1.

The multifunction device 1 could also have an inkjet head instead of a thermal head 65 and print by ejecting ink onto roll paper. Further alternatively, a thermal line printer, a dot impact printer, a laser printer, or a dye sublimation printer, for example, could be used instead of an inkjet recording head.

The foregoing embodiment describes configuration in which a host computer 100 externally connected to the multifunction device 1 controls the multifunction device 1, but the host computer 100 and multifunction device 1 could be combined in a single integrated device.

The function units shown in the block diagrams in FIG. 1 and FIG. 2 simply illustrate one functional configuration, the function units do not need to be rendered as discrete hardware devices, and the functions of plural function units can be combined in a single hardware device, or a single function unit can be rendered using plural hardware devices, through the cooperation of software and hardware.

The program run by the CPU 101 of the host computer 100 that executes the operations described above is not limited to being stored in the storage unit 110, and may be stored on a removable recording medium, or stored downloadably on another device connected over a communication line, and the host computer 100 could download and run the program from the other device. This also applies to the application program 111, device driver program 112, and operating system 113 that are run by the CPU 101. Other aspects of the configuration can also be changed as desired.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A host device configured to control a multifunction device having a plurality of devices that process a plurality of types of media, the host device comprising:
a plurality of application execution units configured to respectively execute a plurality of application programs of a printer that prints on roll paper and a check processor that reads magnetic ink characters on a check;
a port controller configured to receive data from the multifunction device through a connection port, exclusively control data input from at least one of the plurality of application execution units, and send data from the connection port to the multifunction device; and
a plurality of interfaces each corresponding respectively to one of the plurality of application execution units, each interface selectively passing status information including information of medium processing received by the port controller to its corresponding application execution units or discarding the status information;
wherein the multifunction device is external to the host device.

2. The host device described in claim 1, wherein the status information is received from the multifunction device in response to a specific command sent from the host device to the multifunction device, the host device further comprising:
a plurality of filters each corresponding to a respective one of said plurality of interfaces, each filter selectively extracting the status information to be passed to its corresponding application execution unit based on the command to that the status information is a response to.

3. The host device described in claim 1, further comprising:
a plurality of device-driver command controllers each respectively corresponding to one of said plurality of application programs, wherein each device-driver command controller generates a command controlling the multifunction device based on data input from its respective application execution unit, and
the generated command is one of a normal command causing the multifunction device to execute a particular device function in sequence, a real-time command that is executed by the multifunction device with priority over the normal command, and an auto-status-back command that causes the multifunction device to send the status information when the status related to the auto-status-back command changes.

4. The host device described in claim 3, wherein:
the port controller exchanges data with the multifunction device through a single connection port,
passes data received from the multifunction device through the single connection port to the plurality of interfaces, and
exclusively sends a command generated by any one of the plurality of device-driver command controllers through the single connection port to the multifunction device.

5. A method of controlling a host device configured to control a multifunction device having a plurality of devices that process a plurality of types of media, the method comprising:
executing a plurality of application programs of a printer that prints on roll paper and a check processor that reads magnetic ink characters on a check;
receiving data from the multifunction device through a single connection port connected to the multifunction device, exclusively permitting data from at least one of the plurality of application programs to be sent through the single connection port to the multifunction device; and selectively passing status information of medium processing received from the multifunction device to multiple of said application programs and not passing the status information to the remaining of said application programs;

wherein the multifunction device is external to the host device.

6. The method of controlling a host device described in claim 5, wherein the status information is received from the multifunction device in response to a specific command sent from the host computing device to the multifunction device, the method further comprising:

for each respective application program, determining if the status information is useful to the respective application program based on the command that the status information is a response to, and if it useful then extracting the status information and passing it to the corresponding application program, else not passing it to the respective application program.

7. The method of controlling a host device described in claim 5, further comprising:

generating commands controlling the multifunction device based on data from the application programs;

the generated commands including a normal command causing the multifunction device to execute a particular device function in sequence, a real-time command that is executed with priority over the normal command, and auto-status-back command that causes the multifunction device to send the status information when the status related to the auto-status-back command changes.

8. The method of controlling a host device described in claim 7, further comprising:

exchanging data with the multifunction device through the single connection port;

passing to the application programs data received from the multifunction device through the connection port; and exclusively sending a command from one of said application programs through the single connection port to the multifunction device.

9. A non-transitory computer-readable storage medium that stores a program executed by a control unit configured to control a multifunction device having a plurality of devices that process a plurality of types of media, wherein the program causes the control unit to execute operations of:

executing a plurality of application programs of a printer that prints on roll paper and a check processor that reads magnetic ink characters on a check;

receiving data from the multifunction device through a single connection port connected to the multifunction device, exclusively permitting data from at least one of the plurality of application programs to be sent through the single connection port to the multifunction device; and selectively passing status information of medium processing received from the multifunction device to multiple of said application programs not passing the status information to the remaining of said application programs;

wherein the multifunction device is external to the control unit.

10. The host device described in claim 1, wherein a plurality of said application execution units receive the status information concurrently from their respective interfaces.

11. The host device described in claim 1, wherein each interface selectively passing the status information received by the port controller to its corresponding application execution unit based on the command that the status information is a response to.

12. The host device described in claim 1, wherein a plurality of said application execution units are active concurrently.

13. The host device described in claim 1, wherein each interface is interposed between its corresponding application execution unit and the port controller.

* * * * *